(12) United States Patent
Mou et al.

(10) Patent No.: US 6,398,022 B1
(45) Date of Patent: Jun. 4, 2002

(54) DIGITAL VIDEO DISK HOLDER

(75) Inventors: Lee Ching Mou, Quarry Bay (HK); Lee Choy Tim, Ontario, CA (US)

(73) Assignee: Cheong Wing Electric, Ltd., Quarry Bay (HK)

( * ) Notice: Subject to any disclaimer, the term of this patent is extended or adjusted under 35 U.S.C. 154(b) by 0 days.

(21) Appl. No.: 09/707,338

(22) Filed: Nov. 7, 2000

(51) Int. Cl.[7] ............................................... B65D 85/57
(52) U.S. Cl. ..................... 206/308.1; 206/310; 206/493
(58) Field of Search ............................. 206/308.1, 309, 206/310–312, 493, 472

(56) References Cited

U.S. PATENT DOCUMENTS

| | | | |
|---|---|---|---|
| 5,526,926 A | | 6/1996 | Deja |
| 5,551,560 A | * | 9/1996 | Weisburn et al. ............ 206/310 |
| 5,653,335 A | * | 8/1997 | Bauer et al. ............. 206/307.1 |
| 5,788,068 A | * | 8/1998 | Fraser et al. ................ 206/310 |
| 5,899,327 A | * | 5/1999 | Sykes ..................... 206/307.1 |
| 5,944,181 A | | 8/1999 | Lau |
| D420,240 S | * | 2/2000 | Sorenson et al. ............ D6/632 |
| 6,155,417 A | * | 12/2000 | Flores, Jr. et al. ........ 206/308.1 |
| 6,164,446 A | * | 12/2000 | Law ......................... 206/308.1 |
| D437,171 S | * | 2/2001 | Cuadrado-Serena ......... D6/632 |
| D439,435 S | * | 3/2001 | Belden, Jr. et al. .......... D6/407 |
| 6,196,384 B1 | * | 3/2001 | Belden, Jr. ............... 206/308.1 |
| 6,206,185 B1 | * | 3/2001 | Ke et al. ................. 206/308.1 |
| 6,206,186 B1 | * | 3/2001 | Cerda-Vilaplana et al. ...... 206/308.1 |

* cited by examiner

Primary Examiner—Shian Luong
(74) Attorney, Agent, or Firm—Daniel Kirshner

(57) ABSTRACT

A DVD Holder having a base and a lid hingedly attached thereto, said holder having an improved central disk retaining area. The central disk retaining area comprises a spring locking/releasing mechanism of unitary construction which in turn comprises horizontal disk leveling sections, vertical disk retaining members with disk retaining flanges, and a central button-like member. The central disk retaining area further includes disk support members with disk support ridges molded thereon. An outer disk retaining ring is included that has variable diameter.

6 Claims, 12 Drawing Sheets

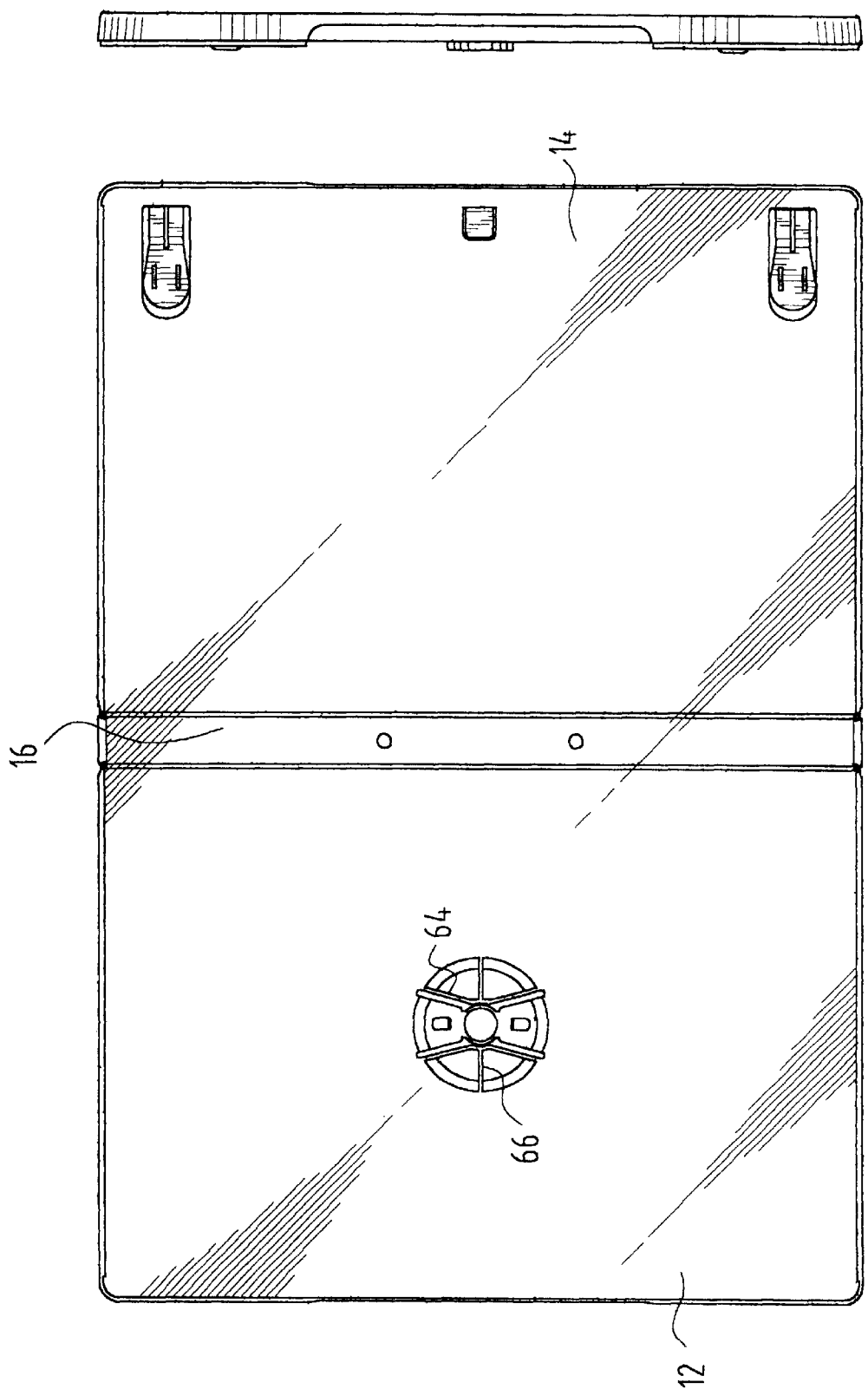

DIGITAL VIDEO DISK HOLDER

FIELD OF THE INVENTION

The present invention is a storage case for optically readable digital versatile disks otherwise known as digital video disks or DVD's. More specifically, the DVD holder of the present invention includes an improved central retaining area for retention of the DVD.

BACKGROUND OF THE INVENTION

Optically readable data disks of the type used for recording data, video, audio and the like are sold by the millions. Common examples of these media include CD's, interactive games, software and recently DVD's. These disks are typically stored in plastic boxes known by the term "jewel boxes". Typically, these jewel boxes include a central disk retaining area that is inserted through the central hole of the disk, thereby retaining the disk it in its position. The disk is typically removed from the jewel box by exerting finger pressure on a central button like member thereby ejecting the disk. Prior art examples of jewel boxes of this nature are disclosed in the following prior art U.S. Patents:

1. U.S. Pat. No. 5,944,181, issued to Lau on Aug. 31, 1999 entitled Disk Protective Enclosure and assigned to Finest Industrial Co. Ltd.
2. U.S. Pat. No. 5,788,068 issued to Fraser et al on Aug. 4, 1998 entitled Apparatus for Holding a Compact Disk and assigned to Dubois Limited.
3. U.S. Pat. No. 5,526,926 issued to Deja on Jun. 18, 1996 entitled Storage Case for Compact Discs and assigned to Viva Magnetics Limited.

Typically, the prior art in the field of jewel boxes include a central disk retaining area that includes two or three individual arms that cantilever up from the base portion of the box. To remove the disk in these prior art boxes, one typically presses down on a button at the crest of the two or three individual arms thereby releasing the disk.

There are several disadvantages to the prior art that are overcome by the present invention. Specifically, in the prior art, when the arms are pressed down to release the disk, the gaps between the individual arms often pinch the skin of the user. This can be painful for the user, and perhaps more importantly, the insertion of the skin into the gap prevents the arm from pressing inward to release the disk. Furthermore, when the arms are pushed inward by the user, it is often not possible to exert equal pressure on all of the arms. As such, this often causes the disk to be released by one engaging arm, but remains secured by the other arms. Thus, because of this synchronization problem the disk continues to be retained.

The present invention overcomes this disadvantage by presenting an engaging and releasing system that is of unitary one-piece construction similar to a bridge-like span that is horizontally parallel to the base. Since the release button and the two engage and release arms of the present invention are a unitary piece, a single push on the release button exerts equal pressure to the release and engage arms thereby avoiding the synchronization problem of the prior art.

In addition, since the prior art depends on several individual arms that project upward from the base terminating in open ends, there is a tendency for the plastic to deform over time. In other words, when a disk is stored over a long period of time, the plastic retaining arms have a tendency not to return to their original positions when the disk is ejected.

The present invention overcomes this disadvantage. As a result of the engage and release mechanism's unitary construction and its inherent resiliency, there is no tendency for the plastic to deform as a result of stress. Furthermore, in the present invention, when the disk is stored in the box, the spring mechanism is not engaged or tensed. Instead, the disk resides solely on the protective ridge of the disk support member and on the support flanges of box's outer ring.

In the prior art jewel box systems, each time the disk retaining arms are depressed to release the disk, stress is placed on the disk itself, thereby bending it and potentially damaging it. This is due to the downward pressure that place on the disk itself transmitted to the disk through the retaining arms. Here, in the present invention, there is no stress or bending of the disk. Again, this is due to the fact that the sole motion when the disk is ejected occurs to the engaging and releasing mechanism while the disk itself remains stationary on the protective ridge and the outer ring.

In the prior art of jewel boxes, it is common for external pressure to be applied to the engage and release mechanism during transportation or storage though the pressure put on exterior portions of the box. This may potentially cause the disk to be released accidentally from engagement, thereby allowing the disk to be loose in the box and out of its proper position. Here, because in the present invention the disk rests on a stationary protective portion comprising the protective ridge and outer ring, external pressure on the box will not free the disk.

Since the optical disk contains information in the form of millions of indentations etched onto the surface of the disk, it is important that the disk be stored in a stress free environment. It is evident that if there is stress placed on the optically readable portions of the disk, there is a potential for damage to occur to the disk thereby corrupting the information. Typically, in the prior art, there is stress placed directly onto the disk. For example, in several of the prior art patents cited above, their ejector pins always exert stress on the disk in an attempt to push it upward.

In the prior art, horizontal (side to side) motion of the disk is regulated by the central retaining structure that is not fixed in height. That is to say, the disk rests on the outer ring portion and the central retaining structure. However, since the central retaining structure may vary in height due to compression, the central retaining structure may not lie on the same horizontal plane as the outer ring. Here, in the present invention, the disk rests on members that are fixed in position. Thus, the vertical members that fit through the central hole of the disk can be fixed in position and the space between them can be reliably fixed at a distance that is just smaller than the diameter of the central hole of the disk. As such, horizontal movement of the disk is regulated in a manner that stores the disk free of stress.

The same can be said of minimizing the motion of the disk in a vertical direction while minimizing the stress placed on the disk. In the present invention, the vertical motion of the disk is regulated by non-compressed members. As such, the vertical motion of the disk can be regulated within a small range while minimizing stress placed on the disk.

Furthermore, in the present invention, the contact between the disk and the jewel box takes place only on portions of the disk that are data free. As such, the potential for scratching of the disk and corruption of its data is reduced.

In prior art jewel boxes, the outer disk rings typically contain a plurality of (usually four) finger depressions so that the disk can be manually removed from the jewel box (see for example U.S. Pat. No. 5,944,181). This presents a disadvantage, as this type of jewel box cannot be used with automatic packaging machines. This is the case, because when an automatic packaging machine is utilized, there is a need to control the position of the mechanism. An improvement in the prior art is exemplified in U.S. Pat. No. 5,778,068 wherein the four depressions are edged to allow the use of automatic packaging machines. This now presents the disadvantage of being awkward for manual removal of the disk. The present invention DVD box overcomes these objections. The outer disk retaining ring of the present invention is of variable diameter. In some areas, it is slightly larger in diameter than the disk. In other areas, it is slightly smaller than the diameter of the disk. As such, the present invention is optimized for use with automatic packaging machines, while still allowing for convenient manual removal of the disk from the jewel box.

The prior art jewel boxes typically have a multitude of large and deep depressions or canals on the back or exterior portions thereof In the present invention, the jewel box is relatively free of such indentations, thereby facilitating attachment of advertising or screen printing.

Other objectives, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a DVD holder of the type used to retain optically readable digital disks otherwise known as a jewel box. The DVD holder has a base and a lid, the lid being hingedly attached to the base by way of a central spine. The DVD holder includes an improved central disk retaining area comprising a spring locking/releasing member of single unitary construction. The spring locking/releasing member comprises horizontal disk leveling sections, vertical disk retaining members that include disk retaining flanges, and a central button-like member that are all molded together into a unitary one-piece element. The central disk retaining area further includes disk support members that further include protective disk support ridges and are molded integrally to the base of the DVD holder. An outer disk retaining ring is included that has a variable diameter that approximates that of the disk in places and is slightly larger in others. On interior portions of the outer disk retaining ring are molded disk support flanges. The disk support flanges rise above the base of the DVD holder to an elevation that is substantially equivalent to the disk support members and the disk leveling members of the central disk retaining area. As such, when inserted into the DVD holder, an optically readable disk rests on the protective ridges of the disk support members and the disk support flanges of the outer ring. A disk is inserted into the present invention and secured by positioning the central hole of the disk over the vertical members of the central disk retaining area. Downward pressure is applied to the disk, thereby causing the vertical members and the disk retaining flanges of the spring locking engaging member to compress inward. Once the disk is inserted, the vertical members resiliently return to their vertical position, thereby causing the disk retaining flanges to secure the disk. Downward pressure on the central button member causes the vertical disk retaining members to compress back inward and force the disk against the disk support members thus ejecting the disk.

BRIEF DESCRIPTION OF THE DRAWINGS

For a better understanding of the present invention, reference is made to the following description of an exemplary embodiment thereof, considered in conjunction with the accompanying drawings, in which:

FIG. 4 is a perspective drawing of a top view of the present invention, the holder being in its open position with the exterior portion visible.

FIG. 5 is a side view of the present invention looking toward the locking surface, the holder being in its open position.

DETAILED DESCRIPTION OF THE INVENTION

Figure 1:
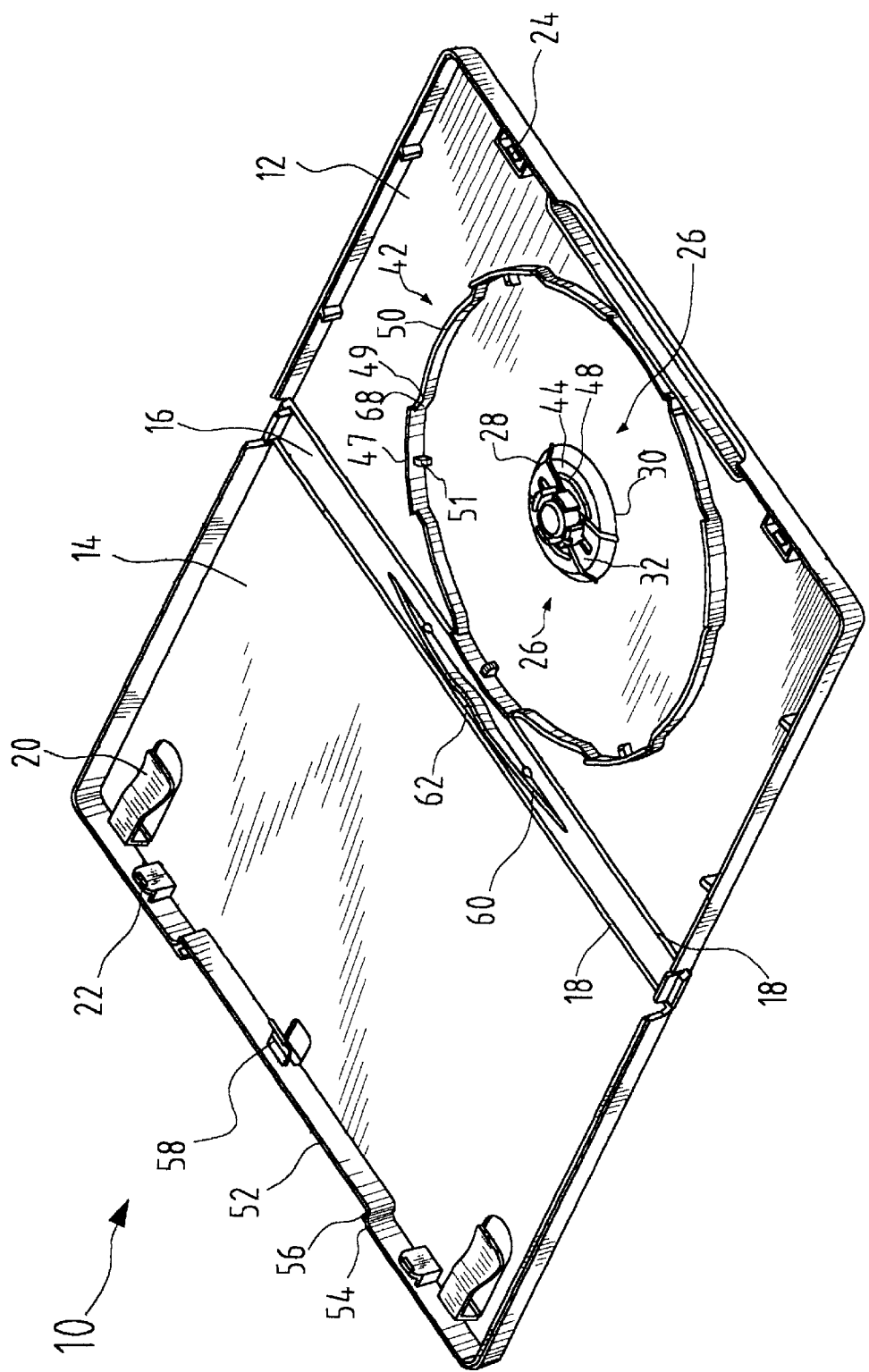
FIG. 1 is a perspective drawing of a top view of the protective disk holder of the present invention, the holder being in its open position with the interior portion visible.
Figures 2, 3:
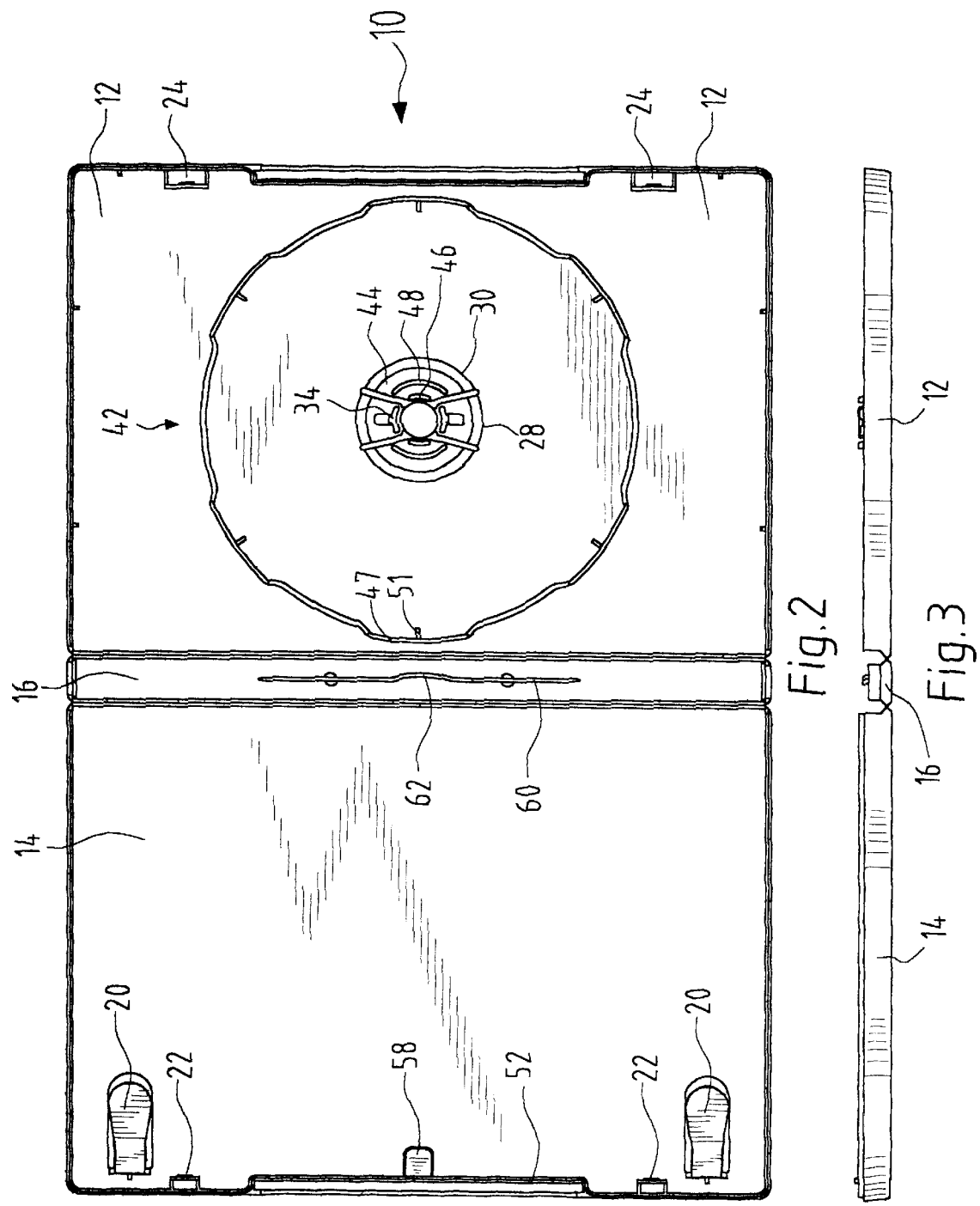
FIG. 2 is a perspective drawing of a top view of the present invention, the holder being in its open position with the interior portion visible.
FIG. 3 is a perspective side view of the present invention, the holder being in its open position and interior open portion facing up.

With reference to FIGS. 1 through 14, the present invention digital video disk (DVD) holder 10 is a holder for retaining optically readable disks (typically a video DVD, an audio CD, computer software or the like). The DVD holder 10 includes a base member 12, and a lid member 14 which is hingedly attached to the base member 12 at spine member 16 by way of hinge members 18. Booklet retaining members 20 which take the shape of clip like devices are molded into the lid member 14 for retaining a booklet or other printed information regarding the enclosed optically readable disk. A male locking member 22 is formed into the lid member 14 and a female locking member 24 is formed into the base member 12. When the DVD holder 10 is in its closed position, the male locking member 22 engages with the female locking member 24 to secure closure.

The video disk holder 10 of the present invention is injection molded from polystyrene or polypropylene or other moldable rigid plastic and is molded as a single unitary device. As such, it can be appreciated that the device is simple to manufacture and can be mass produced at a relatively modest expense.

Attention is now turned to the disk retaining member of the present invention which is designated generally as 26. The disk retaining member 26 is molded integrally into the base member 12 and has an approximate diameter of 1.5 inches. The disk retaining member 26 in turn, comprises three separate elements: a spring locking/releasing portion designated as 28 and two disk support members designated as 30.

Figure 6:
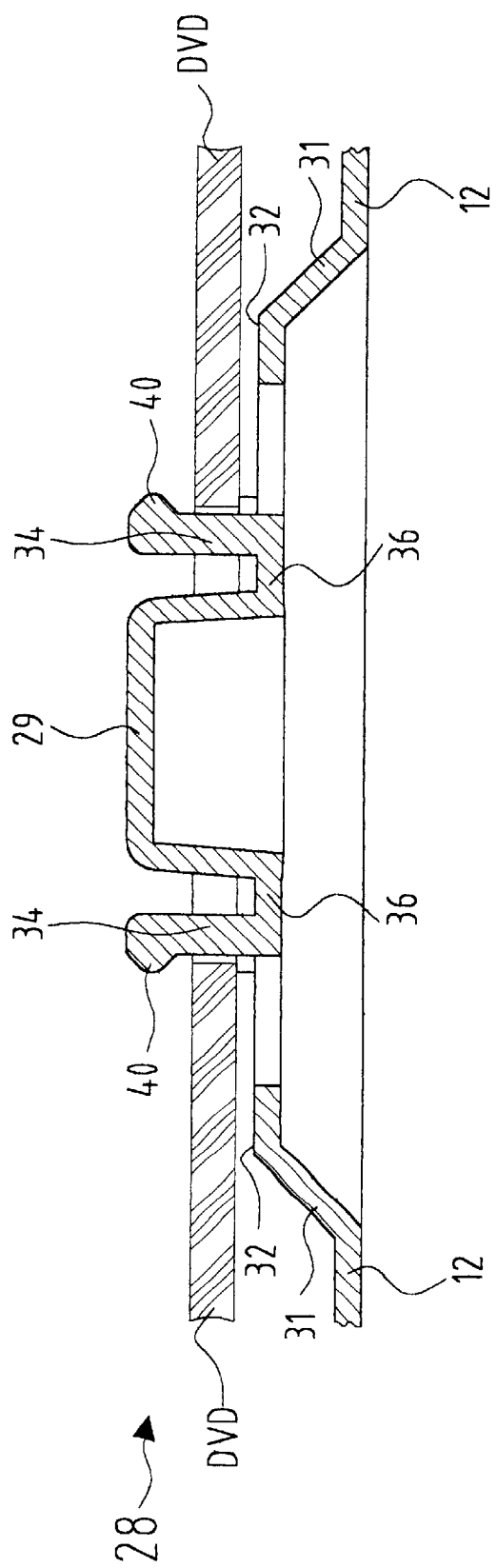
FIG. 6 is a cross-sectional view of the spring locking/releasing member of the present invention which is retaining an optical video disk.

Reference is now directed to FIG. 6 which is a cross-sectional view of the spring locking/releasing portion 28 of the disk retaining member 26. The spring locking/releasing portion 28 is a single unitary piece of plastic that is elevated from the base member 12. As is evident from the Figures, the spring locking/releasing portion is symmetrical about a central circular button 29 (i.e. as viewed in FIG. 6 the right half of the spring locking/releasing portion 28 is an identical mirror image of the left half with the middle of the central circular button 29 being an axis of symmetry.) Two connecting arm members 31 are cantilevered upward from the base member 12 at an angle of approximately 45°. Attached to the connecting arm members 31 and extending in a direction parallel to the base member 12 are horizontal disk leveling sections 32. Attached to the horizontal disk leveling sections 32 and extending vertically in a direction generally perpendicular to the base member 12 are vertical disk retaining arms 34 which extend upward approximately 0.2 inches. Further extending from the horizontal disk leveling sections 32 and on the same plane thereto are connecting sections 36 which connect the horizontal disk leveling sections 32 and vertical disk retaining arms 34 to the central circular button member 29. Disk retaining flanges 40 extends horizontally and outwardly from the vertical disk retaining arm and which taper to a point as can best be viewed in FIG. 6. The central circular button member 29 has a diameter of approximately 0.3 inch and a height of approximately 0.2 inch. As such, and as can be seen in the Figures, the top of the central circular button member 29 is on the same plane as the top of the vertical disk retaining arms 34. The entire locking/releasing portion 28 is resilient. As such, when vertical pressure is applied to the central circular button member 29, the spring/locking engaging portion is compressed downward thereby causing the vertical disk retaining arms 34 and the disk retaining flanges 40 to compress inward toward the center.

Figure 7:
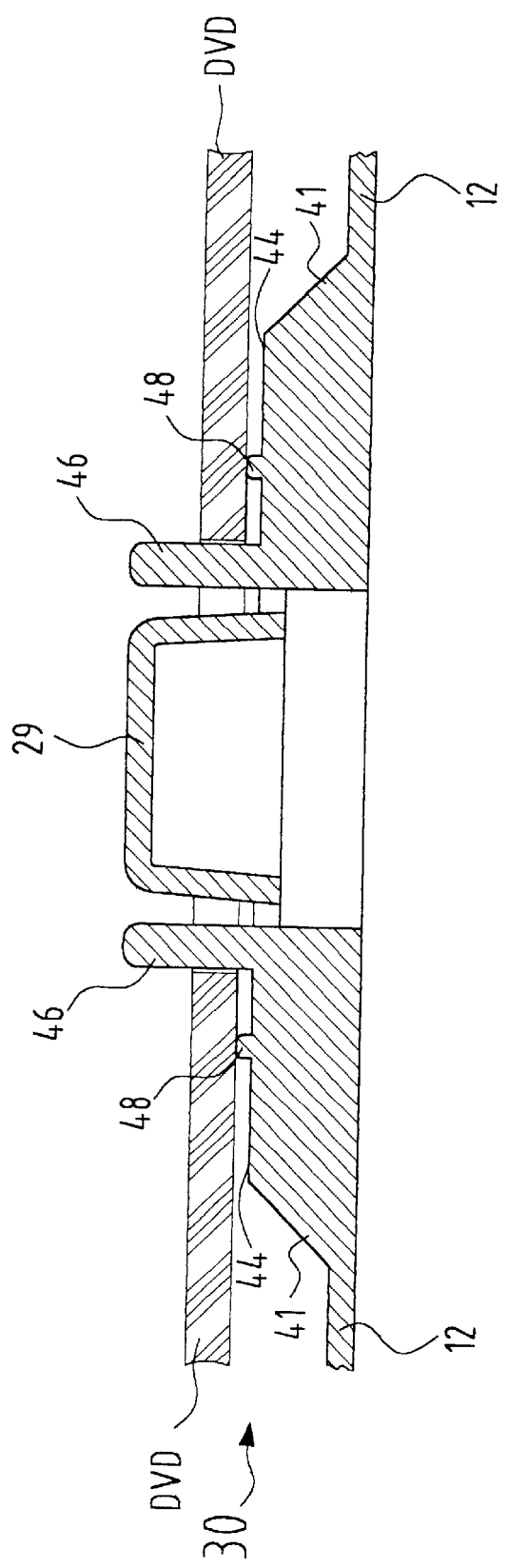
FIG. 7 is a cross-sectional view of the two disk leveling members of the present invention showing the retention an optical video disk.
Figure 8:
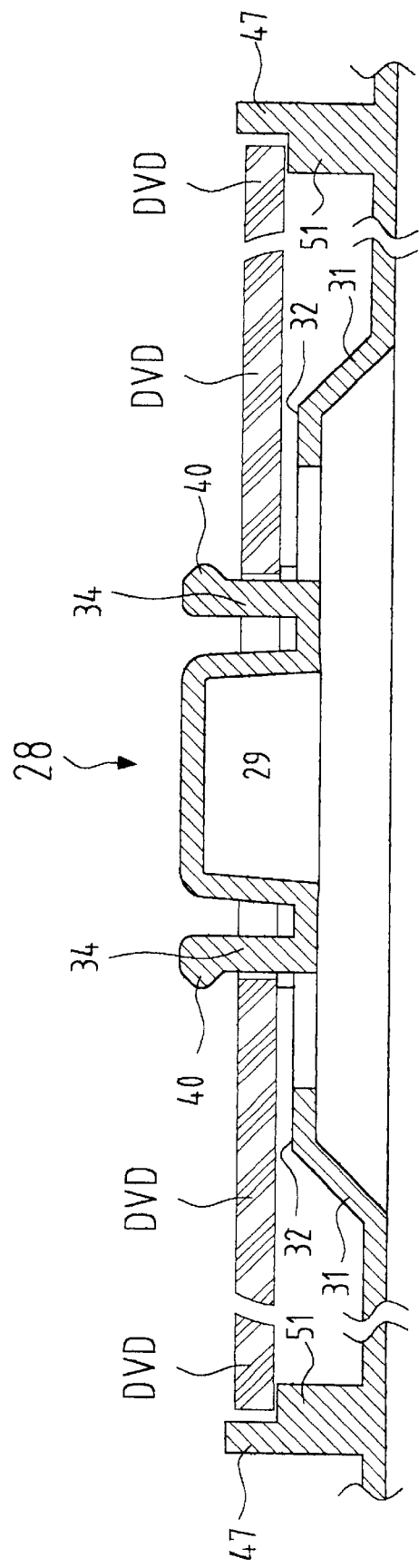
FIG. 8 is a cross-sectional view of the spring locking/releasing member and the outer positioning ring of the presentinvention showing the retention of an optical video disk and showing the position of the disk relative to the outer disk retaining ring.

Turning now to the two disk support members 30 which are best viewed in cross section in FIG. 7. The disk support members 30 include connecting arm members 42 cantilevered upward from the base member 12 at an angle of approximately 45°. Attached to the connecting arms 42 are horizontal shelf members 44 which extend horizontally in a direction that is parallel to the base member 12. Extending upward from the horizontal shelf members 44 are vertical arms 46 which extend upwardly approximately 0.2 inch. As such, the tops of the vertical arms 46 of the disk support members 30 lie on the same plane as the tops of the vertical disk retaining arms 34 and the central circular button member 29 of the locking/releasing portion 28. As indicated by reference number 48, there are disposed on the horizontal disk shelf member 44 disk support protective ridges which rise perpendicularly thereto and upon which the optically readable disk (DVD) rests.

Taken in conjunction, the disk retaining member 26, comprising the spring locking/releasing portion 28 and the two disk leveling members 30, act to secure a video disk into the holder 10. By reference to the figures, it can be seen that all four of the vertical elements designated by 34 and 46 are curvilinear in shape and generally describe a circle that is slightly smaller than the central hole of a DVD. More specifically, a circle described by the vertical elements 34 is slightly smaller than a circle described by the elements 46, as elements 46 are fixed in position and the elements 34 are movable. As such, the position of the DVD is regulated by the elements 46. It is evident that horizontal movement of the DVD is solely controlled by element 46 and can be very precise. Moreover, the disk retaining flanges 40 extend outward. As such, the distance between the ends of the disk retaining flanges 40 is larger than the diameter of the hole in the center of the DVD.

Attention is now turned to the outer disk retaining ring 42 which is best viewed by further inspection of FIG. 1. The outer disk retaining ring generally has the diameter of a DVD, although in some areas it is slightly larger than the optically readable disk and in some areas it has a diameter that is approximately equivalent to that of the optically readable disk. More specifically, at point 47, the outer disk retaining ring 42 has a diameter that is slightly larger than the diameter of the optically readable disk. Then, at point 48, the outer disk retaining ring 42 turns in toward the center at approximately 45°. Next, at point 68, the outer disk retaining ring turns back to regain the generally circular direction to connect to areas of smaller diameter 50, this having a diameter similar to that of the optically readable disk. As can be seen in FIG. 1, the preferred embodiment of the present invention includes an outer disk retain ring having six areas of larger diameter and six areas having smaller diameter. Six disk support flanges 51 are molded to the six areas of larger diameter 47, each flange rising above the base 12 to a height equal to the height of the horizontal shelf member 44 of the disk retaining member 26. Moreover, the six areas of larger diameter 47 of the disk retaining ring 42 raise to a height that is higher than the areas of smaller diameter, i.e. when the disk retaining ring turns inward toward the center, it also becomes lower in height. As such, when a DVD is inserted into the present invention DVD holder 10, it rests upon, and is retained in a horizontal orientation by the following elements: horizontal disk support sections 32, disk support protective ridges 48 of the horizontal disk support members 44, areas of smaller area 49 of the outer disk retaining ring 42, and disk support flanges 51. A disk can be manually removed from the DVD box of the present invention manually by positioning a finger on perimeter portions of the DVD at a location on the outer ring where the outer ring has a smaller diameter. Yet, because of the regions of the outer ring 42 of larger diameter, the present invention is adapted for use with automatic packaging machines.

An optically readable disk is inserted into the DVD Holder 10 by positioning the central hole of the disk over the vertical retaining arms 46 and the disk retaining flanges 40.

Now, downward pressure is applied to the DVD, thereby compressing inward the disk retaining flanges 40 and vertical disk retaining arms 34. In turn, the inward compression of the disk retaining flanges 40 and vertical disk retaining arms 34 allows the disk to move below the level of the disk retaining flanges 40. Thus, the disk rest upon the protective ridges 48 of the disk support members 30 and on the six disk support flanges 51 of the outer disk retaining ring 42. Once the optically readable disk moves below the disk retaining flanges 40, the vertical disk retaining arms 34 and the disk retaining flanges 40, expand back to their original position, thereby locking the optically readable disk into place.

Figure 9:
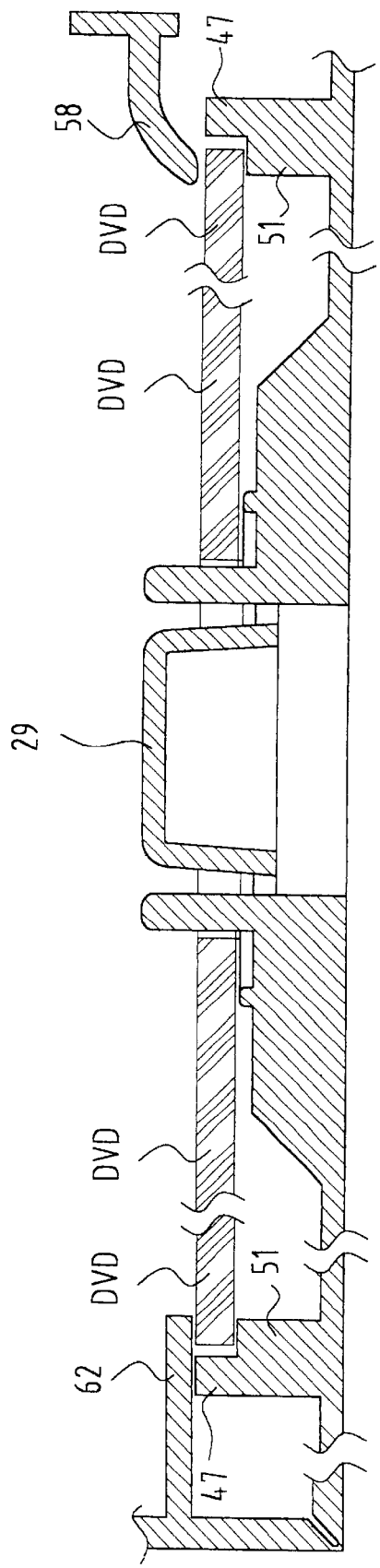
FIG. 9 is a cross-sectional view of one of the two disk retaining members and the outer positioning ring of the present invention showing the DVD holder in its closed position showing the retention of an optical video disk and further showing the opposing disc securing clip.
Figure 10:
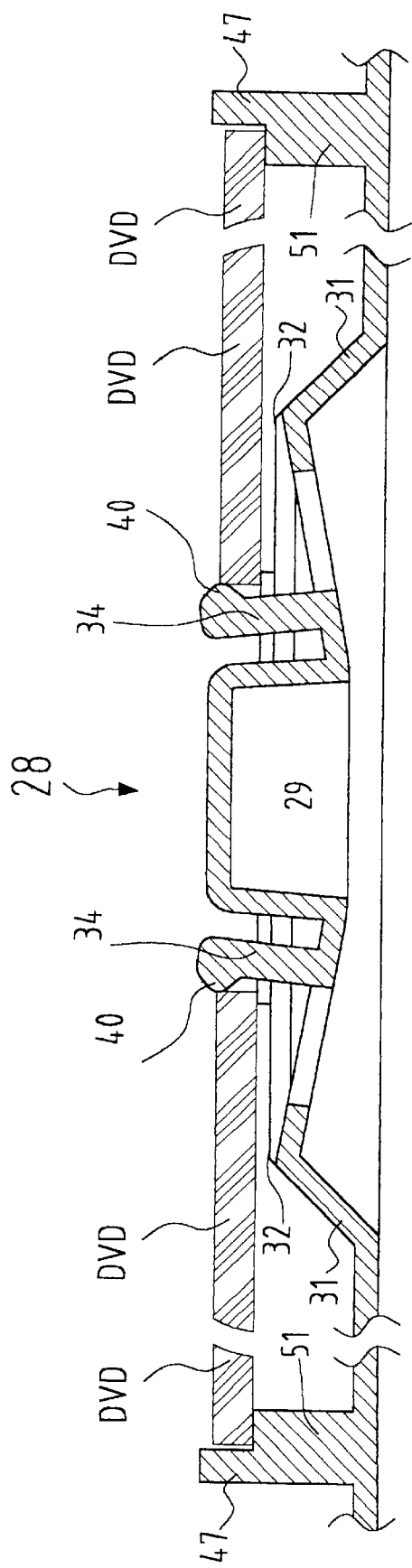
FIG. 10 is a cross-sectional view of the spring locking/releasing member and the outer positioning ring of the present invention showing the central button-like member in its depressed position.
Figure 11:
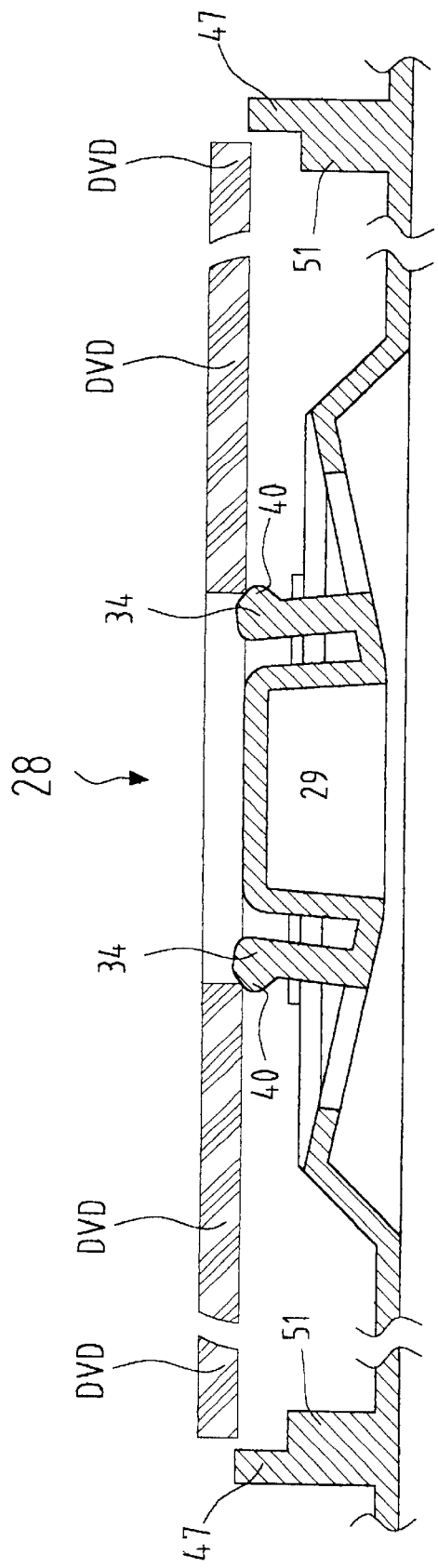
FIG. 11 is a cross-sectional view of the spring locking/releasing member and the outer positioning ring of the present invention showing the spring locking/releasing member in its flexed position and the video disk in its ejected position.
Figure 12:
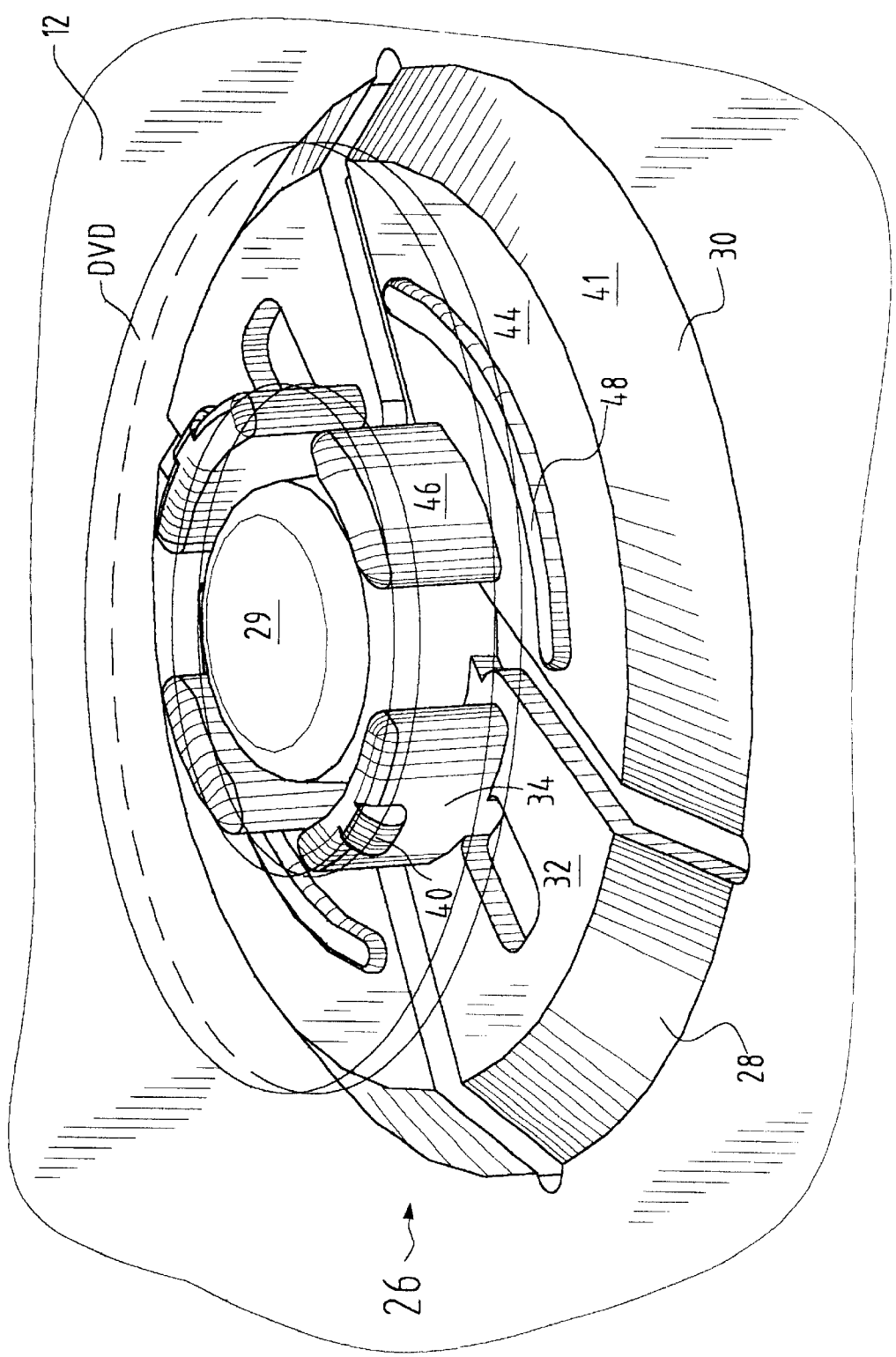
FIG. 12 is a side perspective detail view of the disk retaining member of the present invention further showing an optical video disk.
Figure 13:
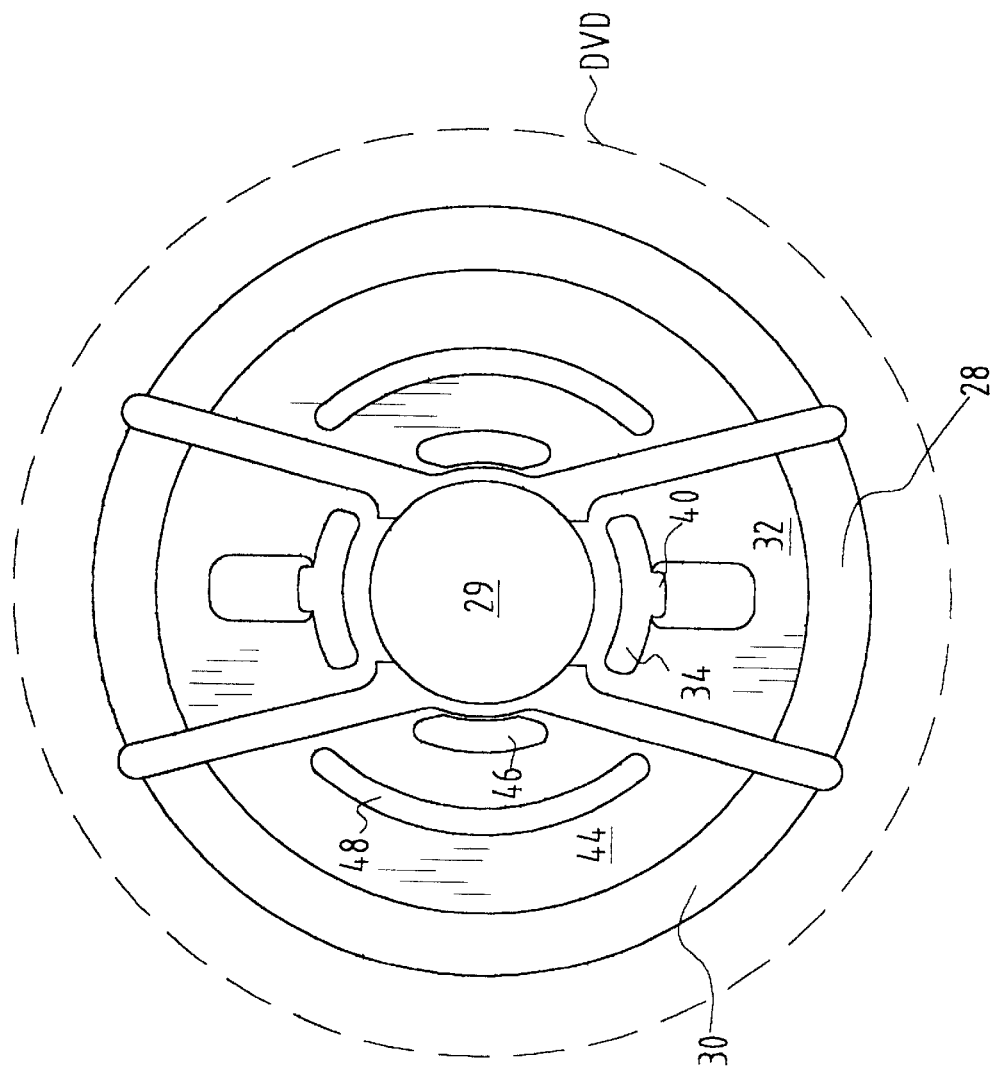
FIG. 13 a top perspective detail view of the disk retaining member of the present invention further showing an optical video disk.
Figure 14:
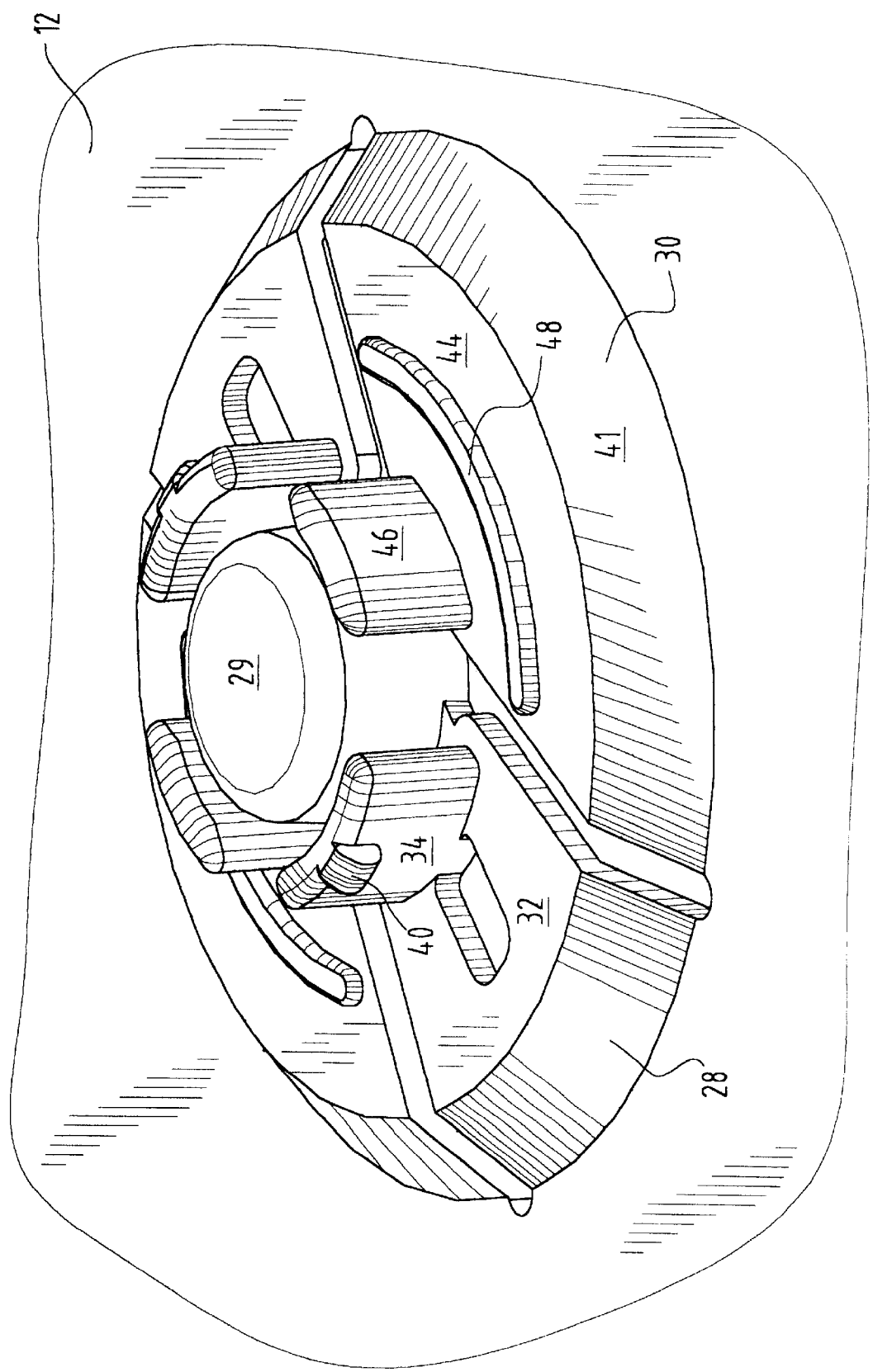
FIG. 14 is a partially elevated side perspective detail view of the disk retaining member of the present invention.

The disk is further held into its position when the lid member 14 is closed and latched into the base member 12. Referring back to FIG. 1, one sees that there is a lid disk securing member (designated generally as 52) molded into the lid portion 14 of the DVD holder. The lid disk securing member 52 is formed onto the side wall of the DVD holder that includes the male locking members 22. At point 54 the disk securing member 52 curves inward from the side wall and then curves back at point 56 so that it is again parallel to the side wall. Designated by 58, a disk securing clip cantilevers up in a curvilinear fashion at the top of the disk securing member 52. As best seen in FIG. 9, when the DVD holder is closed and latched shut, the disk securing clip 58 abuts on the top of the perimeter portion of the optically readable disk thereby pressing it against the disk support flange 51 of the outer disk retaining ring 42. It can be appreciated that the disk securing clip does not make contact with any portion the optically readable disk that contains data or information.

Looking back to FIG. 1, there is a spine disk securing member 60 that is molded onto the interior portion of the spine member 16. The spine disk securing member 60 extends upward from the spine member 16 in a direction that is generally perpendicular thereto. At point 62, a portion of the disk securing member has a curvilinear section. Referring again to FIG. 9 which shows the DVD holder in its closed position, it can be seen that point 62 of the disk securing member presses abuts on the optically readable disk (DVD) at its perimeter portion and presses it against the disk support flange 51 of the section of larger diameter of the outer retaining ring 47.

In order to remove the optically readable disk, downward pressure is applied to the central circular button 29. The pressure on the button 29 causes the spring locking/releasing portion 28 to depress downward due to its inherent resiliency. It can be appreciated that the horizontal disk support members 44 of the disk leveling members 30 are not resilient. As such, the pressure on the center circular button causes the optically readable disk to be pressed against the protective disk support ridges 48, thereby forcing the optically readable disk upward in relation to the spring locking/releasing portion 28. Thus, the disk retaining flanges 40 are compressed inward and the disk is released. It can be appreciated that since the spring locking/releasing portion is of single unitary construction, a single press on the central button-like member 29, exerts equal pressure throughout the spring locking/releasing member 28.

Referring now to FIG. 4 which depicts the reverse or back side of the present invention DVD holder, it can be seen that the back part of the DVD holder is relatively free of depressions or canals. It is thus better adapted for insertion of advertising or print material. Reinforcements 64 and 66 serves to strengthen the DVD holder and make it more reliable.

What is claimed:

1. A holder for retaining an optically readable disk, said disk having a central hole and a predetermined diameter comprising:

a base portion, a central disk retaining member affixed to said base member wherein said central disk retaining member includes (a) two horizontal disk support members rigidly fixed in a position substantially parallel to said base portion, said disk support members further including vertical disk retaining arms extending upward therefrom, and;

(b) a flexible locking-release member formed from a single unitary element elevated from said base portion, said flexible locking release member including a central button, two flexible disk leveling elements attached to said central button, and vertical disk retaining arms extending upward from said disk leveling element, wherein said vertical disk retaining arms of said horizontal disk support members and said vertical disk retaining arms of said flexible locking-release member are configured to traverse the central hole of the optically readable disk, and wherein the optically readable disk is released from said holder by exerting pressure on said central button.

2. The holder for retaining an optically readable disk of claim 1 further including disk support protective ridges extending upward from said horizontal disk support members and rising to a predetermined height above said base portion wherein the optically readable disk contacts said disk support protective ridges when the disk is retained in said holder.

3. The holder for retaining an optically readable disk of claim 2 further including an outer disk retaining ring.

4. The holder for retaining an optically readable disk of claim 3 which includes a first plurality of portions of said disk retaining ring a predetermined distance from said central button and a plurality of disk retaining flanges attached to said first plurality of portions of said disk retaining ring rising to a predetermined height above said base wherein said predetermined height of said flanges is substantially equivalent to said predetermined height of said disk support protective ridges.

5. The holder for retaining an optically readable disk of claim 4 wherein said outer disk retaining ring includes a second plurality of portions having a diameter substantially equivalent to said predetermined diameter of said disk, wherein the optically readable disk contacts said disk support protective ridges, said disk retaining flanges, and said second plurality of portions of said disk retaining ring when said disk is retained in said holder.

6. A holder for retaining an optically readable disk of the type having a central hole comprising:

a base portion;

a flexible locking-release member formed from a single unitary element elevated from said base portion, said flexible locking-release member including a central button, two flexible leveling elements attached to said central button, and vertical disk retaining arms extending upward from said disk leveling elements; and at least one horizontal disk support member rigidly fixed in a position substantially parallel to said base portion, said horizontal disk support member further including vertical disk retaining arms extending upward therefrom, wherein said vertical disk retaining arms of said horizontal disk support members and said vertical disk retaining arms of said flexible locking-release member are configured to traverse the central hole of the optically readable disk.

* * * * *